(12) United States Patent
Jones et al.

(10) Patent No.: US 8,763,747 B2
(45) Date of Patent: Jul. 1, 2014

(54) CONSTRUCTION EQUIPMENT MACHINE WITH IMPROVED CONTROLLER ERGONOMICS

(75) Inventors: Peter Jones, Leicestershire (GB); Chester Harding, Ruffieux (FR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/882,563

(22) PCT Filed: Nov. 5, 2010

(86) PCT No.: PCT/EP2010/006739
§ 371 (c)(1),
(2), (4) Date: Apr. 30, 2013

(87) PCT Pub. No.: WO2012/059117
PCT Pub. Date: May 10, 2012

(65) Prior Publication Data
US 2013/0241251 A1    Sep. 19, 2013

(51) Int. Cl.
*B60N 2/14*    (2006.01)
(52) U.S. Cl.
CPC ..................................... *B60N 2/143* (2013.01)
USPC ............................ 180/329; 180/326; 180/331
(58) Field of Classification Search
CPC .................................. B60N 2/14; B60N 2/143
USPC .......................... 180/326, 329, 330, 331, 334; 296/65.06; 297/344.21, 344.22, 344.23
See application file for complete search history.

(56) References Cited

U.S. PATENT DOCUMENTS

| | | | | |
|---|---|---|---|---|
| 4,026,379 A | * | 5/1977 | Dunn et al. | 180/331 |
| 4,081,051 A | * | 3/1978 | Logsdon | 180/331 |
| 4,934,462 A | | 6/1990 | Tatara et al. | |
| 5,086,869 A | * | 2/1992 | Newbery et al. | 180/329 |
| 5,286,078 A | | 2/1994 | Mottino et al. | |

(Continued)

FOREIGN PATENT DOCUMENTS

| | | |
|---|---|---|
| DE | 20302970 U1 | 5/2003 |
| EP | 1264940 A1 | 11/2002 |

(Continued)

OTHER PUBLICATIONS

International Search Report (Aug. 16, 2011) for corresponding International Application PCT/EP2010/006739.

(Continued)

*Primary Examiner* — James English
(74) *Attorney, Agent, or Firm* — WRB-IP LLP

(57) ABSTRACT

A construction equipment machine includes an operator station equipped with a driver seat which is rotatable around a vertical axis at least from a first operating position to a second operating position through an intermediate position, wherein the machine includes at least a first hand controller which the operator may use at least for some operations and at least in one position of the seat for operating a hydraulic implement. When the seat moves between the first position up to at least the intermediate position, the first hand controller is in a first configuration with respect the seat so as to be in a manipulatable position with respect to the seat, and, when the seat is in its second position, the controller is shifted to a second configuration where it is displaced to a non manipulatable position with respect to the seat.

27 Claims, 4 Drawing Sheets

(56) References Cited

U.S. PATENT DOCUMENTS

| | | | |
|---|---|---|---|
| 6,039,141 A * | 3/2000 | Denny | 180/329 |
| 6,276,749 B1 | 8/2001 | Okazawa et al. | |
| 6,814,174 B2 * | 11/2004 | Fluent et al. | 180/329 |
| 7,219,961 B2 * | 5/2007 | Priepke et al. | 297/344.21 |
| 7,290,635 B2 * | 11/2007 | Bisick et al. | 180/272 |
| 7,347,299 B2 * | 3/2008 | Billger et al. | 180/326 |
| 7,389,845 B2 * | 6/2008 | Longueville et al. | 180/326 |
| 7,434,863 B2 * | 10/2008 | Hamazaki et al. | 296/65.07 |
| 7,472,958 B2 * | 1/2009 | Sano et al. | 297/344.22 |
| 7,681,686 B1 * | 3/2010 | Klas et al. | 180/331 |
| 8,100,457 B2 * | 1/2012 | Dickman et al. | 296/65.03 |
| 2003/0230920 A1 * | 12/2003 | Itou | 297/344.21 |
| 2004/0144590 A1 | 7/2004 | Fluent et al. | |
| 2008/0290694 A1 | 11/2008 | Spellmeyer et al. | |
| 2010/0007181 A1 * | 1/2010 | Ropp et al. | 297/135 |

FOREIGN PATENT DOCUMENTS

| | | |
|---|---|---|
| EP | 1627962 A1 | 2/2006 |
| JP | 06055962 A * | 3/1994 |
| WO | 2009050746 A2 | 4/2009 |
| WO | WO 2009050746 A2 * | 4/2009 |

OTHER PUBLICATIONS

JP10280481A (Oct. 20, 1998) Hitachi Construction Machinery (Abstract).

* cited by examiner

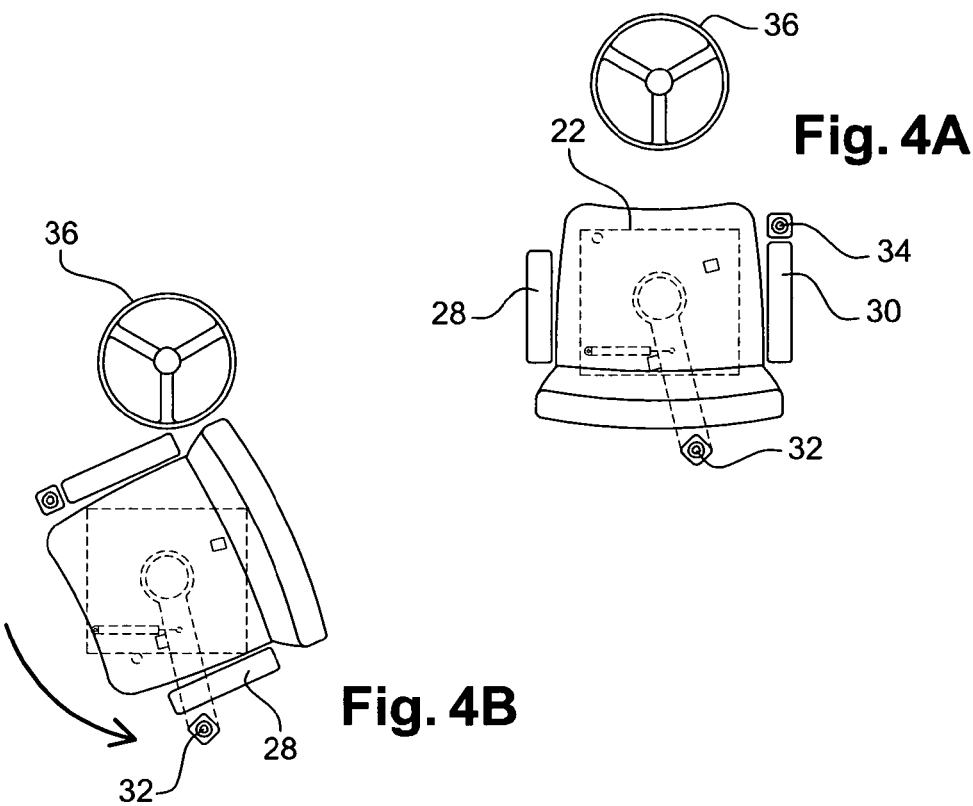
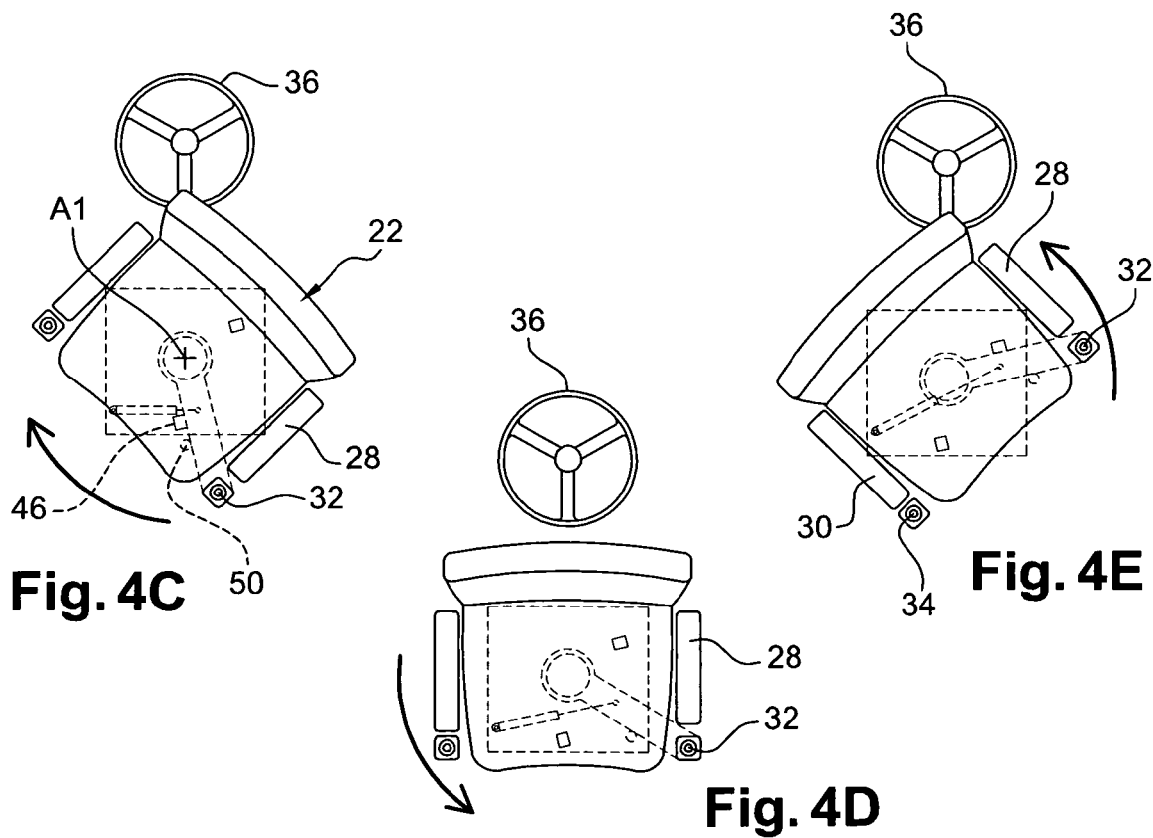

CONSTRUCTION EQUIPMENT MACHINE WITH IMPROVED CONTROLLER ERGONOMICS

BACKGROUND AND SUMMARY

The invention relates to the filed of construction equipment machines. More particularly, it relates to such machines which comprise an operator station equipped with a driver seat which is rotatable around a vertical axis at least from a first operating position to a second operating position through an intermediate position, and wherein the machine comprises at least a first hand controller which the operator may use at least for some operations and at least in one position of the seat for operating an implement.

An example of such machine is a so-called backhoe loader, as depicted in FIG. 1. Such machine comprises a chassis mounted on four wheels and a cabin 10 or operator station mounted on the chassis for receiving an operator of the machine. It derives its name from the fact that it carries two main pieces of equipment, namely a loader equipment 12 at the front, and a backhoe equipment 14 at the rear. The loader equipment 12 comprises essentially two loader arms 16 which are articulated on the chassis and which extend longitudinally towards the front and, at the free ends of the loader arms, a loader bucket 18. The backhoe equipment 14 comprises a backhoe digging apparatus which is articulated on the chassis and which carries at its free end for example an excavator bucket 20. Both equipments are powered by hydraulic cylinders which the operator, in the cabin, controls through hand controllers. Backhoe loaders are equipped with a rotatable seat so that the operator can face forwards, when driving and/or when using the loader equipment, or backwards, when using the backhoe equipment.

Conventionally a back-hoe loader has two sets of hand controller, one set being dedicated to the front equipment, which is therefore placed to be within easy reach to the operator when he is facing forwards, and the other set dedicated to the rear equipment, which is therefore placed to be within easy reach to the operator when he is facing rearwards. For example, the loader equipment can be controlled with only one joystick-type hand controller, while the backhoe equipment needs two joystick-type hand controllers, which the operators uses simultaneously, one with each hand.

A backhoe loader such as the one described above is well known to the skilled man in the art and is for example commercially available as "Volvo BL 71".

Document U.S. Pat. No. 4,934,462 discloses a control device for a dual function machine where the operator seat is equipped with two hand controllers which are permanently connected to the seat, each one being located substantially in front of a corresponding armrest of to the seat. A switching device makes sure that one of the hand controllers, which is used for a first function when the seat is in a first position, is used for a second function when the seat is in a second position. It can be noted that the second hand controller is disabled when the seat is in the second position, but nevertheless remains at the same place relative to the seat in that second position where it is not used. Therefore, in the second position of the seat, the unneeded presence of the second hand-controller can be a hindrance, for example when entering or leaving the seat, or when using another controller, such as a steering wheel.

Document EP-1.264.940 discloses a backhoe-loader having a first hand controller connected to the seat and a second hand controller which is not connected to the seat, inasmuch as is does not move with the seat when the seat is pivoted around its vertical rotation axis. Therefore, in the seat position where it is not needed, the second hand controller is not a hindrance. On the other hand, because the second controller has a fixed position with respect to the seat's movements around a vertical axis, the second hand controller is less convenient to use if the operator wants to operate with the seat at a certain angle from the straight rearward facing direction, for example when digging somewhat to the side of the machine.

It is desirable to provide a new operator cabin arrangement for a construction machine which is globally more ergonomic to use and operate.

The invention provides, according to an aspect thereof, for a construction equipment machine, comprising an operator station equipped with a driver seat which is rotatable around a vertical axis at least from a first operating position to a second operating position through an intermediate position, wherein the machine comprises at least a first hand controller which the operator may use at least for some operations and at least in one position of the seat for operating a hydraulic implement, characterized in that, when said seat moves between the first position up to at least the intermediate position, the first hand controller is in a first configuration with respect the seat so as to be in an manipulatable position with respect to the seat, and in that, when the seat is in its second position, the controller is shifted to a second configuration where it is displaced to a non manipulatable position with respect to the seat.

In one embodiment, an aspect of the invention provides a seat arrangement for construction equipment machine comprising:

a seat support, on which the seat is mounted so as to rotate around a vertical axis, a controller bracket which is mounted so as to rotate around said axis with respect to both the seat and the seat support, an abutment member on the seat for engaging the controller bracket means for biasing the support bracket towards the abutment member an end stop on the seat support to stop the support bracket.

In another embodiment, the machine comprises:

a seat (22) which is mounted so as to rotate around a vertical axis (A1) at least from a first operating position to a second operating position through an intermediate position;

a seat position sensor for detecting at least said intermediate position of the seat;

a first hand controller bracket (44) which is mounted so as to be displaceable by a displacement device with respect to the seat from a manipulatable position to an non manipulatable position;

means for controlling the displacement device so that the bracket is maintained in its manipulatable position when said seat moves between the first position up to at least the intermediate position, and is displaced to its non manipulatable position when the seat is moved beyond its intermediate position.

DESCRIPTION OF FIGURES

FIGS. 4A to 4E show various positions of the seat and an associated position of a first hand controller according to an exemplary embodiment of the invention.

DETAILED DESCRIPTION

Figure 1:
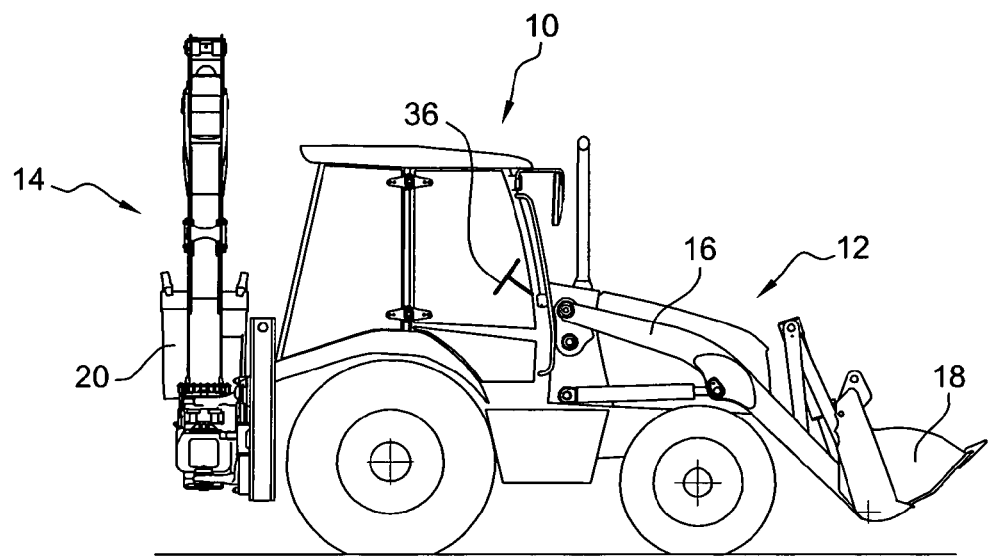
FIG. 1 is a side view of a backhoe loader in which the invention can be implemented.
Figure 2:
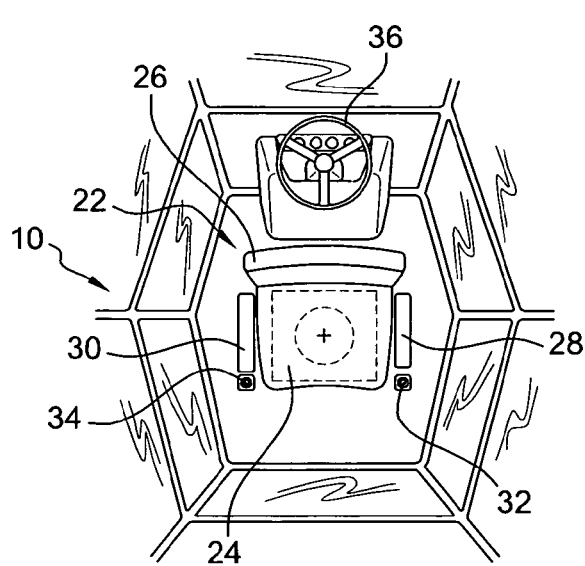
FIGS. 2 and 3 are top views of the inside of the cabin of a backhoe loader showing the first and second operating positions for the seat, in a first embodiment of the invention.
Figure 3:
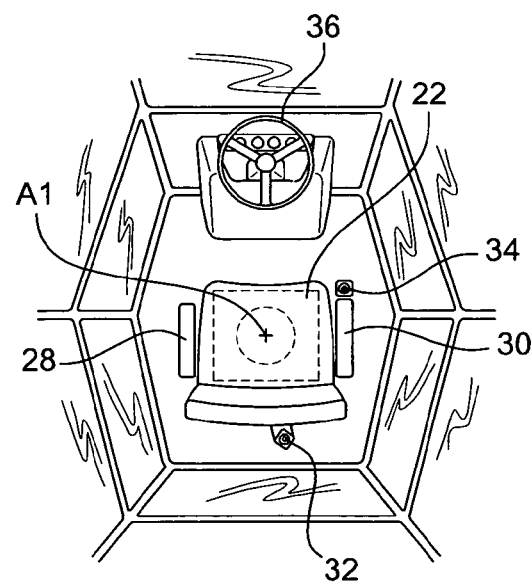

On FIGS. 2 and 3 is shown schematically the inside of the cabin 10 according to a first embodiment of the invention, essentially in view of showing the seat arrangement 22 which comprises for example a seating portion 24, a backrest 26, a first armrest 28 and a second armrest 30, and which can be set in at least two operating positions inside the cabin 10. For example, in FIG. 2, the seat 22 is in a first operating position which is convenient for the operator when using the backhoe equipment 14. The seat is then preferably facing towards the rear of the machine. A first hand controller 30 and a second hand controller 32 are accessible to the operator and are operative to operate the backhoe equipment. In the shown example, both controllers 32, 34 are of the joystick type and they are located substantially in front of the corresponding armrest 28, 30 so as to be easily operated respectively by the operator's left and right hand. Both controllers are then in a manipulatable position with respect to the seat such that the controllers can be conveniently operated, preferably without the operator needing to lift his forearms from the corresponding armrest. In FIG. 3 is shown a second operating position of the seat 22 which is convenient for the operator when using the front loader equipment 12, or simply when driving the machine, as shown by the presence of a steering wheel 36 in the forward portion of the cabin. The seat is then preferably facing towards the front of the machine. The cabin could comprise other elements, including other controller or consoles, which are not shown in FIGS. 2 and 3.

In the shown example, the movement of the seat between the first and second positions is a simple rotation of the seat by 180 degrees around a vertical axis A1 which substantially coincides with the center of the seating portion 24 of the seat 22. Nevertheless, it must be noted that the first and second positions could be different. For example, depending on the type of machine, the two positions could be at 90 degrees from each other. Also, the movement of the seat may not necessarily be a pure rotation as in the example, but may involve a more complex movement in a substantially horizontal plane between the two positions. Such movement may for example be achieved through a more complex kinematics, but can nevertheless be considered as involving a rotation around a virtual vertical axis, for example as a combination of a rotation and of a translation. In any case, the movement of the seat between the two operating conditions involves a passage by intermediate positions.

As visible in FIG. 3, in the second operating position of the seat, at least one of the hand controllers, here the first hand controller 32, is not in the same configuration with respect to the seat as for the first operating position of the seat. Moreover, in the second operating position of the seat, the first hand controller is not conveniently accessible to the operator seating on the seat 22, and is therefore in a non-manipulatable position with respect to the seat. In fact, it is then virtually inaccessible, but is then in a position where it does not hinder the operator. One can nevertheless notice that the corresponding armrest 28 has followed the movement of the seat towards the second position, so that the operator may continue to use the armrest in the second position, while he cannot anymore access tot the corresponding controller 32. In other words, in the second configuration of the seat arrangement, the first hand controller 32 is remote from the corresponding armrest 28.

On the other hand, in this specific example, it can be seen that the second hand controller 34 may follow the movement of the seat through its movement from the first to the second operating positions, for example because this second hand controller may be used in the first seat position for operating the first implement, here the backhoe equipment 14, and for operating, in the second position of the seat, the second implement, here the loader equipment 12. In this example, the second hand controller may simply be carried by the corresponding armrest or may be in any other way permanently connected to the seat. Therefore, in this embodiment, the second hand controller is fixed relative to the seat whatever the position of the seat.

In FIGS. 4A to 4E, it is shown how, when said seat moves between the first position up to at least the intermediate position, the first hand controller is in a first configuration with respect the seat so as to be in an manipulatable position with respect to the seat, and in that, when the seat is in its second position, the controller is shifted to a second configuration where it is displaced to a non manipulatable position with respect to the seat. More specifically to this embodiment, in a first configuration of the seat and controller arrangement, the first hand controller 32 may move with the seat 22 when the seat 22 moves between the first position up to at least an intermediate position, and, in a second configuration, the first hand controller 32 is disconnected from the seat and rests in a stand-by position when the seat is in its second position.

In FIG. 4D, the seat is represented in the first position. In this position, the first hand controller 32 is shown to be in a manipulatable position which is ergonomically optimal for an operator to use it, for example, just as an extension of the corresponding armrest.

In FIG. 4C, the seat 22 is represented in an intermediate position between the first and second operating positions. In this position of the seat, it can be seen that the first hand controller 32 is substantially in the same position, with respect to the seat, as when the seat is in its first operating position. In other words, the manipulatable position of the controller is a fixed position with respect to the seat as long as the seat lies between is first position and its intermediate position. Indeed, in this example, the first hand controller 32 is connected to the seat so as to substantially move with the seat 22 when said seat moves between the first position and the intermediate position. Preferably, this connection is found for all positions between the first position and the intermediate position. As a consequence, the first hand controller 32 moves with the seat 32 between a first position, corresponding to the first position of the seat 22 and visible on FIG. 4D, and an end position, corresponding to the intermediate position of the seat 22 and visible on FIG. 4C. The connection with the seat can be a mechanical connection, as will be seen further in this example, or it could be achieved by any other system capable of displacing the first hand controller 32 with respect to the cabin 10 in parallel to the movement of the seat 22 with respect to the cabin around the vertical axis A1. For example, the first hand controller could be displaced by an actuator which would be controlled automatically as a function of the movements of the seat. The movement of the seat could for example be sensed through proper sensors, or, in case the seat movement between the first and second operating positions would be caused by a seat actuator, the seat actuator and the controller actuator could be controlled by a control unit in such a way that the seat and the controller move in parallel.

On FIG. 4B, the seat is shown in a further position, between the intermediate position and the second operating position which is shown on FIG. 4A. It can be seen that, between the intermediate position and the second operating position, the first hand controller has been shifted to a second configuration, which, in this embodiment, implies that the first hand controller does not follow the seat anymore. In other words it can be said that, by contrast, the first hand controller is disconnected from the seat when the seat moves further from the intermediate position towards the second position.

The transition from the first configuration, where the controller follows the movements of the seat, to the second configuration, where the controller does not anymore follow the movements of the seat, could be triggered manually by the operator, for example by unlocking a connecting mechanism or by terminating a routine in a controller actuator control unit. Nevertheless, in a preferred embodiment of the invention, the disconnection of the first hand controller is automatic when said seat is rotated past the intermediate position towards the second position. This automatic disconnection can be controlled purely mechanically, as will be seen in the following example, or may result of an electronic disconnection system.

When the seat comes back from the second operating position to the first operating position, the controller is preferably brought back to its first configuration, i.e., in this embodiment, reconnected to the seat. This reconnection could be triggered manually by the driver, by a specific action. But preferably, this reconnection should be made automatic. Various options are possible. Such re-connection could result automatically from the operator grabbing the first hand controller again while being in the first operating position or near thereof. Alternatively, as in the proposed embodiment, the re-connection can result from the seat coming back to a predefined position or range of positions, without any other action by the operator.

It can be noted that the intermediate position of the seat, which is the limit up to which the hand controller follows of the movement of the seat, can be fixed once and for all for a given machine. Alternatively, such position could be adjustable so as to allow an operator to adapt this position to his particular way of operating the machine and/or to a particular job to be performed.

In the embodiment of the invention shown on FIGS. 2 to 7, it can be seen on FIGS. 4A and 4B that, when the seat 22 is between its intermediate and second positions, the first hand controller 32 is maintained in its end position, which is the position it occupies when the seat is in its intermediate position. The end position is then a stand-by position of the hand controller while the seat is moved further than the intermediate position towards the second position. Alternatively, when the first hand controller is disconnected from the seat, it could be automatically returned to a stand-by position different from the end position.

Figure 5:
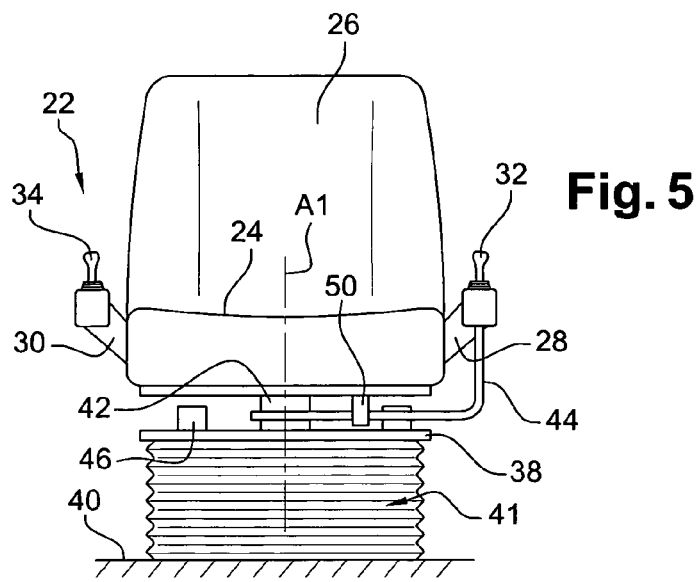
FIGS. 5 and 6 are respectively schematic front and top view of a seat arrangement comprising a controller bracket according to an embodiment of the invention.
Figure 6:
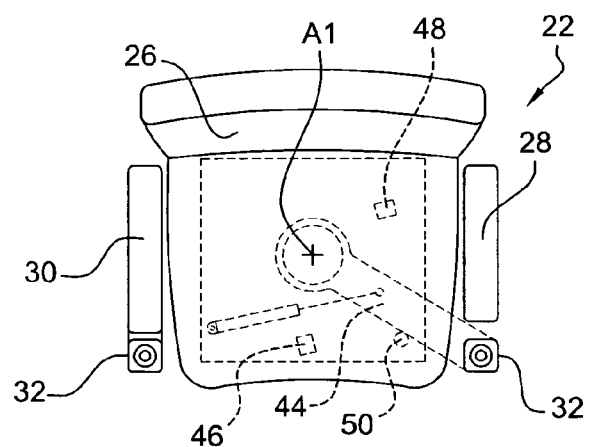
Figure 7:
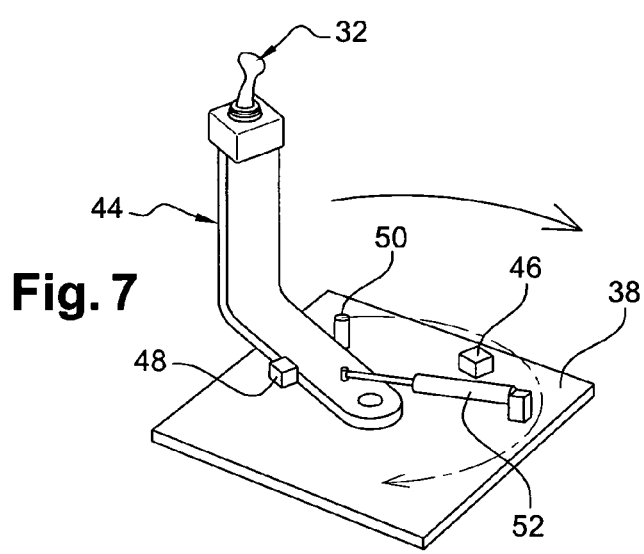
FIG. 7 is a schematic perspective view of some elements of the seat arrangement of FIGS. 5 and 6.

On FIGS. 5, 6 and 7 is represented more in detail an embodiment of a seat and controller arrangement according to the invention. In this arrangement, the seat 22 is mounted on a seat support plate 38 which itself is mounted on the cabin floor 40, for example through a suspension and height adjustment system 41 which may allow a vertical displacement of the seat support plate and of the seat with respect to the cabin floor 40. Of course, the seat support could be fixed with respect to the cabin floor or could simply be integral with the cabin floor. The seat is mounted on the support by a central pivot 42 which allows rotation of the seat 22 with respect to the seat support plate around vertical axis A1. Both armrests 28, 30 are connected to the seat so as to rotate with the seat around axis A1. In other words, the armrest is in the same position with respect to the seat when said seat moves from its first operating position to its second operating position. The right hand side hand controller 34 is for example integrated with the corresponding right hand side armrest 30, and is therefore fixed with respect to the seat, except for a possible adjustability of the position of the armrest 30 and/or of the hand controller 34 with respect to the seat to accommodate the size and preferences of a given operator.

On the other hand, it can be seen that the left hand side controller 32 is not mounted on the corresponding armrest 28 but is mounted on a dedicated bracket 44. The bracket 44 is connected to the seat assembly so as to be able to rotate around axis A1 independently with respect to both the seat 22 and to the seat support plate 38. In the shown example, the bracket 44 comprises for example a horizontal portion which is rotatively connected to the central pivot 42 of the seat and extends radially therefrom in a horizontal plane above the seat support plate 38 but under the seating portion 24 of the seat 22. From the distal end of the horizontal portion, a vertical portion extends upwards and supports the hand controller 32. The size and shape of the bracket 44 is designed so that, when the bracket and the seat are in a given angular position with respect one to the other, the controller 32 is conveniently placed for use by an operator seating on the seat. In the case of a seat equipped with armrests, as in the shown example, the controller is preferably located then just in front of the armrest. In such an embodiment, the controller can therefore rotate around axis A1 with respect to the seat support 38, and therefore with respect to the cabin 10, but also with respect to the seat 22 itself.

In the shown embodiment, an end stop 46 is provided on the seat support plate 38 to limit the possibility of the bracket in rotation in one direction by being in the way of the horizontal part of the bracket. The end stop 46 is the element which determines the intermediate position of the seat 22 from which the hand controller 32 stops following the movement of the seat in the direction of the second operating position. Optionally, an opposite end stop 48 can also be provided to similarly block the rotation of the bracket 44 at an opposite end position. The opposite end stop 48 could correspond to the first operating position of the seat. In the shown embodiment, the end stops 46, 48 are fixed with respect to the support plate, but at least one of them could be made adjustable, so as to give the possibility to adjust the corresponding end position of the controller.

Nevertheless, it can be provided that, if the seat is able to move in the opposite direction from the first operating position, i.e. towards the opposite position shown on FIG. 4E, the controller would then also stay in its first configuration. In this embodiment, the controller then follows the seat up to the seat opposite position. As in the shown example, the seat may then also rotate from the first position in the opposite direction, and the first hand controller may move with the seat in that direction, at least up to an opposite end position for the first hand controller. In the shown example, the two end stops 46, 48 define an operating range of positions, which extends on both sides of the first operating position, and for which the first hand controller 32 remains in its first configuration by staying in a manipulatable position with respect to the seat.

On the other hand, an abutment member 50 is provided on the lower surface of the seating portion 24 of the seat, for abutting against the horizontal part of the bracket 44, in order to block the relative rotational movement of the bracket 44 with respect to the seat in one direction. In this embodiment, the abutment member of the seat is always on the same side of the bracket 44 as the end stop 46 of the seat support plate 38. A biasing means 52, which could be in the form of a spring, either compression spring, traction spring or torsion spring, but which is here embodied as pneumatic cylinder spring, biases the bracket 44 in rotation around axis A1 in the direction against the abutment member 50 of the seat. In the shown embodiment, the biasing means is a compression pneumatic cylinder spring which is connected on one side to the seat support plate 38 and on the other side to the bracket 44 for urging the bracket 44 against the abutment member 50 of the seat. Thereby, as long as the bracket 44 does not contact any of the end stops 46, 48, the biasing means cause the bracket to follow exactly the movement of the seat around axis A1. To the contrary, if the seat 22 moves beyond the intermediate position shown on FIG. 4C toward the second operating position, as shown in FIGS. 4A and 4B, then the bracket is stopped by the end stop 46 at its end position and cannot follow any further the movement of the seat. Thereby, the end stop 46 causes the disconnection of the controller 32 from the seat by preventing the biasing means 52 from urging the bracket against the abutment member 50 of the seat. In this embodiment, the stand-by position of the controller 32 is the end position as defined above.

When the seat rotates back towards the first operating position, the abutment member 50 of the seat 22 comes into contact again with the bracket 44 as soon as the seat reaches the intermediate position of FIG. 4C, and, as the seat travels back to the first position, the abutment member 50 forces the bracket in the same direction.

Nevertheless, in other embodiments, the stand-by position of the hand controller could be different from the end position. For example, the abutment member 50 could be equipped with magnetic means to connect the seat and the controller bracket, the disconnection being obtained by the same end stop 46. In such a configuration, the magnetic means are equivalent to the biasing means in that they maintain the support bracket in contact with the abutment member, and thereby force the support bracket to follow the movements of seat up the end stop. On such embodiment, elastic return means could be provided between the seat support plate and the bracket to bring back the bracket against the opposite end stop 48 as soon as the magnetic means are disengaged when the bracket interferes with the end stop 46.

In this embodiment, the seat is suspended vertically, and the first hand controller obviously follows the vertical movements of the seat. Such feature is desirable at least in the first configuration, i.e. as long as the controller is still connected to the seat because that is when the operator may use the controller.

In the embodiment of FIGS. 2-7, the first hand controller 31 rotates around the same axis A1 as the seat. This is desirable to make sure there is virtually no relative movement between the seat and the controller within the operating range in which the controller moves with the seat. Of course, some amount of movement may be considered as tolerable, allowing more freedom in the choice and design of the means for guiding the movements of the seat and/or of the controller.

In the shown embodiment, in the first configuration in which the controller moves with the seat, the second hand controller is located symmetrically to the first hand controller with respect to the seat. But this may not necessarily be the case, especially if the two hand controllers are not of the same type.

Thanks to the invention, the operator can use the first hand controller along the whole operating range in an optimal position, but is then relieved from the presence of the first controller when the seat is oriented back to the second operating position where this first hand controller is not used. Optionally, the first hand controller is activated when it is in its first configuration and is de-activated when it is in its second configuration, meaning that the hand controller cannot anymore control the implement. This avoids that an accidental interference with the hand controller in its second configuration will not cause an undesired movement of the implement. in the embodiment of FIGS. 2 to 7, the activation and deactivation of the first hand controller can be controlled through a sensor able to detect the relative position of the first hand controller with respect to the seat, for example by detecting the position of the bracket 44 holding the controller with respect to the position of the seat. The sensor can for example detect that the controller bracket is in contact with the abutment member 50. As long as such conctact is detected, the controller can be activated, and the controller can be deactivated as soon as the contact between the bracket 44 and the abutment member 50 is lost.

The operating range along which the first hand controller is connected to the seat and follows its movements extends over a sufficient range for the operator to be able to control corresponding hydraulic implement comfortably whatever the job situation. Preferably, the operating range extends over more than 15 degrees, preferably at least 45 degrees. The operating range is not necessarily centered on the first operating position of the seat. On the other hand, the stand-by position of the first hand controller is preferably sufficiently remote from the second operating position to so that the controller is no more a hindrance for the operator in that position. For example, in the context of the embodiment of FIGS. 2-7, the stand-by position of the controller should correspond to at least 30 degrees, but preferably more than 60 degrees, of rotation of the seat from the second operating position. In the shown embodiment, the stand by-position is represented as corresponding approximately to 120 degrees of the seat from the second operating position (see position of seat at FIG. 4C).

Figure 8:
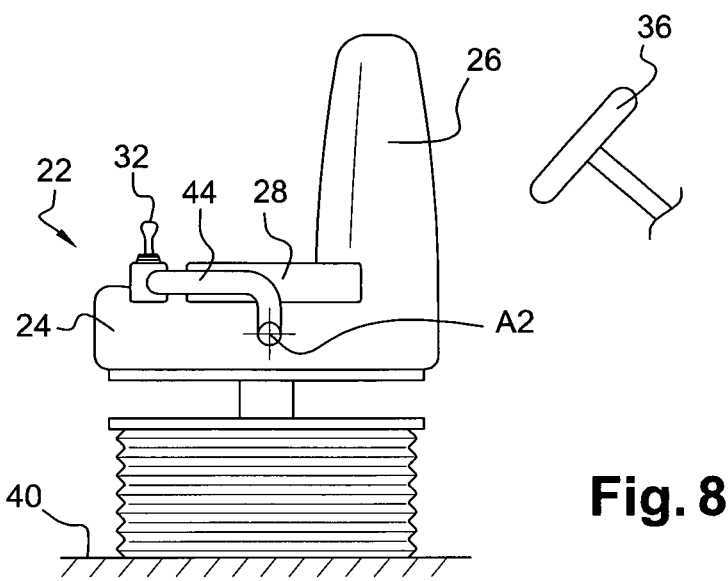
FIGS. 8 and 9 are two side views of a second embodiment of the invention, with a seat equipped with a hand controller which is displaceable with respect to the seat from a manipulatable position to a non-manipulatable position.
Figure 9:
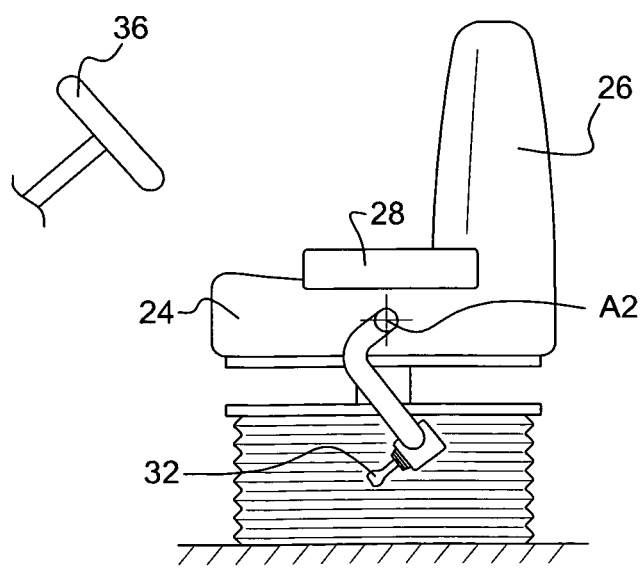

On FIGS. 8 and 9 is shown schematically a second embodiment of the invention which will be described only inasmuch as it differs from the first embodiment, all other features, optional or not, of the first embodiment being otherwise transposable to this embodiment. In this embodiment, the controller bracket 44 is in fact mounted on the seat 22 so as to pivot around a substantially horizontal axis A2, between a first position where the controller is in a manipulatable position, as shown on FIG. 8, and a second position where the controller is in a non-manipulatable position, as shown on FIG. 9. By this rotation of the bracket 44, the controller is shifted downwardly with respect to the seat, on the side thereof. The controller bracket can be displaced by an actuator which would be controlled automatically as a function of the movements of the seat. The movement of the seat can for example be sensed through proper sensors, or, in case the seat movement between the first and second operating positions would be caused by a seat actuator, the seat actuator and the controller actuator could be controlled by a control unit in such a way that the seat and the controller move in parallel. In this embodiment, the first hand controller 32 is connected to the seat so as to move with the seat from the seat's first operating position to its second position and so as to be maintained in a manipulatable position with respect to the seat, when said seat moves between the first position up to at least the intermediate position, and to be displaced to a non-manipulatable position when the seat is in its second position.

Variants of the second embodiment of the invention could involve a different mechanism for displacing the controller bracket with respect to the seat, with possibly a different movement.

The hand controllers according to the invention can be of any type. Preferably, they are hydraulic or electric pilot controllers. More particularly, they are proportional controllers, where the control signal (which can be electric, hydraulic, magnetic, mechanical, etc. . . . ) is proportional to an amount of displacement of the controller by the operator. They are used to control for example hydraulic or electric actuators on the implement.

The invention claimed is:

1. A construction equipment machine, comprising
   an operator station equipped with a driver seat which is rotatable around a vertical axis at least from a first operating position to a second operating position through an intermediate position,
   at least a first hand controller which the operator may use at least for some operations and at least in one position of the seat for operating an implement,
   wherein, when the seat moves between the first position up to at least the intermediate position, the first hand controller is in a first configuration with respect to the seat where the first hand controller moves with the seat so as to be in a manipulatable position with respect to the seat, and wherein, when the seat is rotated past the intermediate position towards the second position, the controller is automatically shifted to a second configuration where the controller is displaced to a non manipulatable position with respect to the seat.

2. The construction equipment machine according to claim 1, wherein the first hand controller is connected to the seat so as to move with the seat from the first to the second position and so as to be maintained in a manipulatable position with respect to the seat, when the seat moves between the first position up to at least the intermediate position, and to be displaced to a non manipulatable position when the seat is in the second position.

3. The construction equipment machine according to claim 1, wherein, in the first configuration, the first hand controller may move with the seat when the seat moves between the first position up to at least the intermediate position, and, in the second configuration, is disconnected from the seat and rests in a stand-by position when the seat is in the second position.

4. The construction equipment machine according to according to claim 3, wherein the first hand controller moves with respect to the operator station together with the seat between a first position, corresponding to the first position of the seat, and an end position, corresponding to the intermediate position of the seat.

5. The construction equipment machine according to claim 4, wherein the end position of the first hand controller is adjustable.

6. The construction equipment machine according to claim 3, wherein, when the seat is between the intermediate and second positions, the first hand controller is maintained in the end position.

7. The construction equipment machine according to claim 2, wherein when the first hand controller is disconnected from the seat, it is automatically returned to a stand-by position.

8. The construction equipment machine according to claim 2, wherein the first hand controller rotates with respect to the operator station and with respect to the seat around the same axis as the seat.

9. The construction equipment machine according to any claim 1, wherein the seat comprises at least one operating armrest on which a machine operator may rest his forearms when operating the machine, and wherein, in the first configuration, the first hand controller is located substantially in front of the armrest with respect to the seat.

10. The construction equipment machine according to claim 9, wherein, in the second configuration, the first hand controller is remote from the armrest.

11. The construction equipment machine according to claim 8, wherein the armrest is in the same position with respect to the seat when the seat moves from the first position to the second position.

12. The construction equipment machine according to claim 1, wherein the seat is suspended vertically, and wherein the first hand controller follows the vertical movements of the seat, at least in the first configuration.

13. The construction equipment machine according to claim 1, wherein the seat may also rotate from the first position in the opposite direction, and wherein the first hand controller is maintained in the first configuration when the seat moves in that direction.

14. The construction equipment machine according to claim 13, wherein the first hand controller may move with the seat in the opposite direction, at least up to an opposite end position for the first hand controller.

15. The construction equipment machine according to claim 1, wherein the manipulatable position of the controller is a fixed position with respect to the seat as long as the seat lies between the first position and the intermediate position.

16. A construction equipment machine, comprising:
    a seat support, on which a seat is mounted so as to rotate around a vertical axis,
    a first hand controller bracket which is mounted so as to rotate around the axis with respect to both the seat and the seat support,
    an abutment member on the seat for engaging the controller bracket,
    means for biasing the controller bracket towards the abutment member,
    an end stop on the seat support to stop the controller bracket.

17. The construction equipment machine according to claim 16, wherein the seat comprises at least one operating armrest on which a machine operator may rest his forearms when operating the machine, and wherein, in the first configuration, the first hand controller is located substantially in front of the armrest with respect to the seat.

18. The construction equipment machine according to claim 17, wherein, in the second configuration, the first hand controller is remote from the armrest.

19. The construction equipment machine according to claim 17, wherein the armrest is in the same position with respect to the seat when the seat moves from the first position to the second position.

20. A construction equipment machine, wherein the machine comprises:
    a seat which is mounted so as to rotate around a vertical axis at least from a first operating position to a second operating position through an intermediate position;
    a seat position sensor for detecting at least the intermediate position of the seat;
    a first hand controller bracket which is mounted so as to be displaceable by a displacement device with respect to the seat from a manipulatable position to an non manipulatable position;
    means for controlling the displacement of the controller bracket so that the controller bracket is maintained in the manipulatable position when the seat moves between the first position up to at least the intermediate position, and is displaced to the non manipulatable position when the seat is moved beyond the intermediate position.

21. The construction equipment machine according to claim 20, wherein the seat comprises at least one operating armrest on which a machine operator may rest his forearms when operating the machine, and wherein, in the first configuration, the first hand controller is located substantially in front of the armrest with respect to the seat.

22. The construction equipment machine according to claim 21, wherein, in the second configuration, the first hand controller is remote from the armrest.

23. The construction equipment machine according to claim 21, wherein the armrest is in the same position with respect to the seat when the seat moves from the first operating position to the second operating position.

24. A construction equipment machine, wherein the machine comprises:
- a seat which is mounted so as to rotate around a vertical axis at least from a first operating position to a second operating position through an intermediate position;
- a first hand controller bracket which is mounted so as to be displaceable by an actuator with respect to the seat from a manipulatable position to a non-manipulatable position;
- wherein the actuator is controlled as a function of the movements of the seat so that the bracket is maintained in the manipulatable position when the seat moves between the first position up to at least the intermediate position, and is displaced to the non manipulatable position when the seat is moved beyond the intermediate position.

25. The construction equipment machine according to claim 24, wherein the seat comprises at least one operating armrest on which a machine operator may rest his forearms when operating the machine, and wherein, in the first configuration, the first hand controller is located substantially in front of the armrest with respect to the seat.

26. The construction equipment machine according to claim 25, wherein, in the second configuration, the first hand controller is remote from the armrest.

27. The construction equipment machine according to claim 25, wherein the armrest is in the same position with respect to the seat when the seat moves from the first position to the second position.

* * * * *